(12) United States Patent
Mayer et al.

(10) Patent No.: US 11,548,234 B2
(45) Date of Patent: Jan. 10, 2023

(54) FASTENING OBJECTS TO EACH OTHER

(71) Applicant: Woodwelding AG, Stansstad (CH)

(72) Inventors: Jörg Mayer, Niederlenz (CH); Martin Rhême, Beflaux (CH)

(73) Assignee: WOODWELDING AG, Stansstad (CH)

( * ) Notice: Subject to any disclaimer, the term of this patent is extended or adjusted under 35 U.S.C. 154(b) by 161 days.

(21) Appl. No.: 16/753,173

(22) PCT Filed: Oct. 5, 2018

(86) PCT No.: PCT/EP2018/077203
§ 371 (c)(1),
(2) Date: Apr. 2, 2020

(87) PCT Pub. No.: WO2019/068901
PCT Pub. Date: Apr. 11, 2019

(65) Prior Publication Data
US 2020/0282661 A1    Sep. 10, 2020

(30) Foreign Application Priority Data
Oct. 6, 2017    (CH) .................................. 12312017

(51) Int. Cl.
*B32B 41/00*    (2006.01)
*B29C 65/08*    (2006.01)
(Continued)

(52) U.S. Cl.
CPC .......... *B29C 65/08* (2013.01); *B29C 65/4805* (2013.01); *B29C 66/0044* (2013.01);
(Continued)

(58) Field of Classification Search
CPC . B29C 65/08; B29C 65/4805; B29C 66/0044; B29C 66/30321; B29C 66/41; B29C 66/721; B29C 66/7392; B29C 66/742; B29C 66/7461; B29C 66/7486; B29C 66/8322; B29C 66/474; B29C 66/8122; B29C 65/645; B29C 66/1122; B29C 66/21; B29C 66/3022; B29C 66/3452; B29C 65/4835; B29C 66/00441; F16B 5/08; F16B 5/00; F16B 11/006
(Continued)

(56) References Cited

U.S. PATENT DOCUMENTS

| 3,841,947 A | 10/1974 | Bocquet et al. |
| 2013/0118128 A1* | 5/2013 | Luecke ................... B32B 15/08 428/419 |
| 2017/0253358 A1 | 9/2017 | Kogure et al. |

FOREIGN PATENT DOCUMENTS

| JP | 2-227238 | 9/1990 |
| JP | 2011-63002 | 3/2011 |

(Continued)

*Primary Examiner* — Michael N Orlando
*Assistant Examiner* — Joshel Rivera
(74) *Attorney, Agent, or Firm* — Rankin, Hill & Clark LLP

(57) ABSTRACT

A method of fastening at least one second object to at least one first object, wherein mechanical vibration acts from a sonotrode on the second object to fasten the second object to the first object. Between the sonotrode and the second object, an auxiliary sheet is placed, for example of paper. After the vibration stops, the auxiliary sheet is displaced relative to the sonotrode for a next fastening step.

33 Claims, 5 Drawing Sheets

(51) Int. Cl.
   *B29C 65/48*   (2006.01)
   *B29C 65/00*   (2006.01)
   *F16B 5/08*    (2006.01)

(52) U.S. Cl.
   CPC ........ *B29C 66/30321* (2013.01); *B29C 66/41* (2013.01); *B29C 66/721* (2013.01); *B29C 66/7392* (2013.01); *B29C 66/742* (2013.01); *B29C 66/7461* (2013.01); *B29C 66/7486* (2013.01); *F16B 5/08* (2013.01)

(58) Field of Classification Search
   USPC .................... 156/60, 64, 350, 351, 378, 379
   See application file for complete search history.

(56) References Cited

FOREIGN PATENT DOCUMENTS

| | | |
|---|---|---|
| WO | 98/42988 | 10/1998 |
| WO | 00/79137 | 12/2000 |
| WO | 2008/080238 | 7/2008 |
| WO | 2014/075200 | 5/2014 |
| WO | 2016/071335 | 5/2016 |
| WO | 2016/142602 | 9/2016 |
| WO | 2017/055548 | 4/2017 |
| WO | 2017/178468 | 10/2017 |
| WO | 2018/065601 | 4/2018 |
| WO | 2018/069193 | 4/2018 |

\* cited by examiner

FASTENING OBJECTS TO EACH OTHER

BACKGROUND OF THE INVENTION

Field of the Invention

The invention is in the fields of mechanical engineering and construction, especially mechanical construction, for example automotive engineering, aircraft construction, railcar construction, shipbuilding, machine construction, building industry, toy construction etc. It more particularly relates to processes of fastening objects to each other.

Description of Related Art

In the automotive, aviation and other industries, there has been a tendency to move away from steel only constructions and to use other materials, including lightweight material such as fiber composites, or other polymer-based materials or ceramics, instead. The new materials and material combinations bring about challenges in connecting technology. For example, conventional rivets often are applicable only if the objects to be connected together are both metallic. Connections by other means than metallic rivets or bolts may also be advantageous in terms of weight and cost, so that such alternative connections may also be important for metal-to-metal connections.

Among the newly developed connections, there are connections that are activated by mechanical vibration energy, especially ultrasonic vibration energy. For example, WO 98/42988, WO 00/79137, WO 2008/080 238, WO 2014/075200 and other publications all disclose approaches with an element having thermoplastic material that is bonded to an object by mechanical vibration energy being coupled into the element until a flow portion of the thermoplastic material is flowable and flows relative to the object whereby after re-solidification a positive-fit connection with the object is achieved. For example, WO 2017/055 548 discloses approaches for bonding an object including thermoplastic material to a, for example, sheet-like object with an edge, in which mechanical vibration is coupled into either the thermoplastic material or into the sheet-like object (which may be metallic) to cause the thermoplastic material to become flowable and to flow relative to the sheet-like material for bonding. WO 2016/071 335 discloses a method of bonding a, for example, metallic object to an object with thermoplastic material, wherein the for example metallic object is pressed by a vibrating tool against the fist object to liquefy material of the first object. WO 2017/178468 and WO 2018/065601 disclose approaches in which a resin is placed between two objects to be connected, and vibration energy is coupled into at least one of the objects to activate the resin. The object into which the vibration is coupled may for example be metallic.

Coupling vibration energy into objects of comparably hard material, especially metallic objects may feature some challenges. Especially, if both, the tool (for example, sonotrode) by which the vibration is coupled into the object and the object itself are hard, for example metallic, substantial noise will be generated. Also, the tool and the object have their individual vibration behaviour with resonance frequencies and resonance wavelength that are generally not equal. For example, sonotrodes will often have a comparably homogeneous amplitude vector, both, in terms of value and in terms of direction, because of their stiffness and the fact that usually sonotrodes are designed for different elements. In contrast thereto, for example plate-like objects will tend to build up plate oscillations, which may, for example, include a node in the middle of the plate-like objects (or of a plate portion thereof) and a free edge—thus a system of membrane oscillations (being two-dimensional bending oscillations) has to be coupled to a system of purely axial/longitudinal oscillation. This is not trivial. The coupling efficiency suffers from this, especially because the different vibration behaviour will lead to coupling only at certain contact points instead of over an entire contact surface. Further, the intimate direct contact between the tool on the one hand and the object on the other hand will result in a substantial flow of heat into from the object into the tool as soon as the object is sufficiently hot. This also has an adverse impact on the efficiency.

To solve this problem, it would be possible to use a sonotrode with a soft (distal) coupling-out surface as the tool, so that the soft material balances out any mismatches and absorbs sound waves. However, the sonotrode would then be subject to substantial wear.

JP H 02227238 discloses to feed a paper tape between a processing surface of a processing horn and a workpiece in an ultrasonic welding process. Thereby, the workpiece is prevented from welding to the processing surface.

US 2017/0253358 discloses to use a vibratable layer of, for example, office paper in a process in which two packaging films are laminated to each other so that these layers are easily separable. To this end, the vibratable layer is interposed between an ultrasonic horn and the films or between the vibratable films and an anvil so that the effect of the ultrasonic vibrations is reduced and the adhesion between the films becomes smaller. Also WO 2016/142602 and U.S. Pat. No. 3,841,947 show interposing stripes of, for example, paper between a horn and an object to be bonded in an ultrasonic welding process. JP 2011/063002 teaches to load a so-called cushioning material to a horn and/or an anvil in an ultrasonic welding method.

SUMMARY OF THE INVENTION

It is therefore an object of the present invention to provide a method bonding at least one second object to a first object, which method includes coupling mechanical vibration into the second object from a vibrating tool, and which method overcomes drawbacks of prior art methods. Especially, the method should be improved in terms of coupling between the vibrating tool and the second object.

According to an aspect of the invention, therefore, a method of fastening at least one second object to at least one first object is provided, the method including the steps of:
Providing the first object including a first attachment surface;
Providing the second object;
Placing the second object relative to the first object,
Placing a sonotrode relative to the second object,
Placing an auxiliary sheet between the sonotrode and the second object; and
causing mechanical vibration to act from the sonotrode on the second object via the auxiliary sheet to locally bond the second object to the first object (fastening step);
wherein the auxiliary sheet is made of paper-like material.

The auxiliary sheet may especially have anisotropic properties, especially anisotropic damping properties.

Anisotropic properties may, for example, be present in the form of structure.

Anisotropic damping properties—referring to the condition where the sonotrode is pressed against the auxiliary sheet, with the auxiliary sheet clamped between the sonotrode and the second object—may be due to one or a combination of the following:

According to a first possibility, the paper-like material may be a paper-like material of low density (sometimes referred to as "high-volume paper"). Examples of low density papers are so-called blotting paper or low-density cardboard. Paper of normal density has a thickness of 0.1 mm if the grammage is 100 g/m². Such normal density paper is dense, i.e., the space between fibers is filled by adhesive. Therefore, its properties, especially its elastic modulus, are/is essentially homogenous. In contrast, the paper-like material according to this first possibility has a thickness of at least 0.15 mm or at least 0.2 mm for a grammage of 100 g/m², i.e., a density of at most 670 kg/m³, preferably at most 500 kg/m³ or at most 350 kg/m³. Paper of this quality has the property that only little or no binder and/or filler is present between the fibers, and the fibers only touch each other point-wise. Therefore, there is a substantial volume between the fibers (hence the absorbing property of blotting paper). Thus, there is comparably little contact between the solid parts (fibers) making up the paper-like material and consequently also only a small capability of the fibers to transfer forces between them. However, when the sonotrode acts to compress the auxiliary sheet, the fibers will be pressed against each other, and the modulus in z-direction increases, as does the capability to transfer axial (longitudinal) forces and hence longitudinal vibration. At the same time, the according coupling in-plane directions will not substantially be affected by the compression, so that any in-plane vibrations will not be coupled through.

In special embodiments, the paper-like material is almost free of any binder and/or filler.

According to a second possibility, the auxiliary sheet is a multi-layer sheet, especially with little bonding or no bonding between the layers. Thereby, relative movements in in-plane directions may be absorbed between the layers of the multi-layer sheet. In accordance with a special option, there may be a polymer layer between paper-like material layers so that the relative friction between the layers is further reduced.

According to a third possibility, the auxiliary sheet is of a compressible paper-like material, for example cardboard material, such as a sandwich cardboard with two thin outermost layers and an intermediate layer with reduced average density and a substantial gas-filled volume. An example is corrugated cardboard. The intermediate layer due to its properties and low density is not able to transfer substantial in-plane movements between the outermost layers, whereas after compression the compressible cardboard material transfers axial forces and hence longitudinal vibration.

According to a fourth possibility, the auxiliary sheet may be provided with at least one polymer coating. Thereby, friction between the sonotrode and the auxiliary sheet and/or the auxiliary sheet and the second object is reduced. In addition to serving as de-coupling with regards to in-plane movements, this also results in a reduction of abrasion, as paper itself is due to its fibrous composition rather abrasive.

According to a fifth possibility a thickness of the auxiliary sheet is at least 0.2 mm or at least 0.3 mm or at least 0.4 mm.

Therese possibilities may be combined arbitrarily. For example, the auxiliary sheet may include a sandwich structure with outermost layers and/or intermediate layer being of a reduced density paper, and/or with an outermost polymer coating at least on the side of the sonotrode, etc.

If the paper-like auxiliary sheet is configured according to the first and/or third possibility, the compressibility in z-direction may be a characterizing property. More in concrete, the material may be compressible in z-direction (the direction perpendicular to the x-y-in-plane-directions) so that its thickness is reducible by at least a factor 1.8 or at least a factor 2, 3, or 5, for example by a pressing force that does not exceed a force that damages the cross section structure of the fibers (i.e., by a pressing force that is low enough to keep the cross section of the fibers intact).

In embodiments, the first and second objects are attached to each other by a mechanism different from a mere weld but by at least one of
  a depth-effective anchoring in which a structure of the second object penetrates below a surface of the first object and into material of the first object, and/or vice versa, wherein after anchoring a positive fit connection between the first and second objects results;
  an adhesive bond, in which a resin is provided between the first and second objects, which resin is caused to cross link by the direct or indirect effect of the mechanical vibration.

Especially, a proximally facing coupling face of the second object may be metallic or ceramic. Then, the effect of the approach according to the invention is particularly strong, as a direct metal-to-metal contact between the sonotrode and the second object is prevented by the auxiliary sheet.

The paper-like material may especially be a material of non-woven fin-plans. A paper-like material in the sense of the present text may especially be a material that is sheet-like and pulp based. A pulp-based material is a material made from pulp, i.e., from fibers suspended in a liquid (especially water), which is removed at least partially for the production. The fibers may include vegetable fibers (especially fibers of cellulose (wood-based or from fiber crops)), especially at least 50% or at least 80% vegetable fibers. In addition or as an alternative, the fibers may include mineral fibers or other natural fibers, or man-made fibers, for example on a calcium carbonate basis. The auxiliary sheet may consist of the paper-like material only, or it may be for example laminated paper.

In embodiments, the paper-based auxiliary sheet includes at least 50% cellulose fibers.

In embodiments, the paper-based auxiliary sheet includes fibers of an essentially not compressible material, forming fibers with a very high radial module, such as polymer fibers, glass fibers, mineral fibers.

In embodiments, the paper-based auxiliary sheet has a grammage of at least 50 g/m² or 80 g/m². In a group of embodiments, the paper-based auxiliary sheet is relatively thick, with a grammage of at least 100 g/m², at least 150 g/m² or 200 g/m² or more.

In embodiments, the auxiliary sheet includes a plurality of layers, i.e., at least two layers, for example at least 3 layers.

It is an insight underlying the present invention that auxiliary sheets having the above-discussed properties are especially suited for the purpose of both, damping oscillation components that are not in phase between the sonotrode and the second object, and filtering oscillation vectors that are not axial. At least the latter is because of a high anisotropy between in-plane vs. out-of-plane properties brought about by the approach according to the invention: the auxiliary sheet may have, when the sonotrode presses against it, a high axial module but a low in-plane module and/or a high in-plane damping.

Also, in a metal-to-metal direct contact, the sonotrode effectively hammers onto the second object, and this will cause high-frequency vibrations of the second object not in phase with the sonotrode. These have the effect of enhancing noise and making process control more difficult while not providing any advantage. The auxiliary sheet due to its damping properties serves as a kind of mechanical vibration low-pass filter only slightly damping low frequency axial vibration but very effectively preventing high-frequency vibrations of the second object.

For example, multi-layer heavy paper (often referred to as 'cardboard'), or also other multi-layer paper has a shear stiffness that may be several orders of magnitude below the transversal compressive rigidity. Also, given any in-plane oscillation, a lot of energy will be absorbed due to friction between the layers. Because paper-like materials do not melt, also high amounts of energy may be absorbed without any significant changes in the material properties of the auxiliary sheet. The low heat conduction also leads to a relatively low heating of the sonotrode, which may especially be important when the sonotrode is used for a series of fastening steps (see also the second aspect described hereinafter).

Similar considerations apply for relatively thick and/or relatively heavy paper (grammage 100 g/m$^2$ or more) because in this inner shear movements within the paper structure may arise.

According to embodiments, the method comprises, after a first fastening step of causing mechanical vibration to act from the sonotrode on the second object via a first section of the auxiliary sheet to locally bond the second object to the first object, displacing the auxiliary sheet relative to the sonotrode, and causing mechanical vibration to act from the sonotrode on a different location of the (same) second object or to a different second object via a second section of the auxiliary sheet different from the first section, to locally bond the second object or the different second object to the (same) first object or a different first object (second fastening step).

In this, the first and second fastening steps may be carried out:
  both on the same first object and on the same second object, on different fastening locations of each,
  on the same first object, on different fastening locations thereof, but with different second objects;
  on different first objects but with a same second object, on different fastening locations thereof; or
  on different first objects and on different second objects.

Thus all combinations are possible. This pertains to any embodiment implementing this concept of causing the sonotrode to act via a second, different section of the auxiliary sheet for a second fastening step.

The fastening is carried out using mechanical vibration acting from the sonotrode on the (respective) second object.

This can according to a first possibility be done with a fastening principle as described in WO 2016/071 335 or WO 2018/069 193 (first embodiment), namely with the second object having a coupling structure with an undercut and/or being capable of being deformed to include such a coupling structure with an undercut, and with the first object including thermoplastic material, wherein causing the first object to locally bond to the second object includes pressing the coupling structure of the second object while the mechanical vibration acts until a flow portion of the thermoplastic material of the first object is liquefied and flows into the coupling structure of the second object, whereby after re-solidification a positive-fit connection between the coupling structure and the flow portion secures the second object to the first object.

According to a second possibility, this can be done by an approach in which the step of placing the second object relative to the first object includes placing the second object relative to the first object with a resin between the first attachment surface and a second attachment surface of the second object, and wherein causing the first object to locally bond to the second object includes activating the resin to cross-link by the mechanical vibration, whereby the resin, after cross-linking, secures the second object to the first object, for example as taught in WO 2017/178468 or WO 2018/065601.

The second object is, for example, of a metal or of a ceramic material or of a fiber composite. If the second object is liquefiable and the first object includes thermoplastic material a flow portion of which according to the first possibility is made flowable, the liquefaction temperature is such that it is not flowable at temperatures at which the first thermoplastic is flowable. For example, the liquefaction temperature of the second object material is higher than the liquefaction temperature of the first material by at least 50° or at least 80° C.

The liquefaction temperature is the melting temperature for crystalline polymers. For amorphous thermoplastics the liquefaction temperature is a temperature above the glass transition temperature at which the becomes sufficiently flowable, sometimes referred to as the 'flow temperature' (sometimes defined as the lowest temperature at which extrusion is possible), for example the temperature at which the viscosity drops to below $10^4$ Pa*s (in embodiments, especially with polymers substantially without fiber reinforcement, to below $10^3$ Pa*s)), of the thermoplastic material.

The auxiliary sheet will generally be separate both, from the sonotrode and from the second object. However, the auxiliary sheet may, at the onset of the process, be mounted to the second object and for example stick thereto. It may be removed, for example by pulling off, after the fastening process. For example, to this end the auxiliary element may include an adhesive coating on the side facing the second object.

The auxiliary sheet has the following possible functions:
  Force impact distribution: The second object will have its own vibration behavior with resonance frequency and wavelength generally not equal to the frequency and wavelength, respectively, of the coupled-in vibration. This will lead coupling only at certain contact points instead of over an entire contact surface and to losses. The auxiliary sheet will balance out such mismatches (will balance out impedance mismatches) and thereby improve the coupling properties.
  Heat flow prevention: Often, applicable sonotrodes are of a metal or of an other good heat conductor. The intimate direct contact between the sonotrode on the one hand and the second/first object on the other hand will result in a substantial flow of heat into the sonotrode. The efficiency of the process goes down as a consequence. The auxiliary element has a heat insulating effect drastically reducing the heat flow.
  Noise reduction: it has been found that the noise arising by the coupling between the sonotrode and the second object, if the latter is comparably hard, can be drastically reduced by the auxiliary sheet. This may be attributed to damping properties of the auxiliary sheet, the balancing out of mismatches and the prevention of the transmission of shear forces between the sonotrode and the second object. Especially, the paper-based auxiliary elements have a high capability of coupling longitudinal vibration while not transmitting any shear movements;

Low-pass filtering, see the above remarks.

It has been found that paper-like sheet materials are especially suited for serving as the auxiliary element because they have a superb capability of fulfilling these functions, are mechanically stable, and for example in contrast to many polymer foils they do not soften due to the generated heat and do not substantially deter, also, they do not burn under the conditions that apply during the fastening steps. Further, they are obtainable in various qualities and at low cost, and they are environment friendly. Also, the paper-like sheet materials in the approach described herein have a very high axial stiffness while at the same time being such as to not transmit any shear forces. Paper-based materials are obtainable in a very large range of different hardness.

In a group of embodiments, the auxiliary sheet is provided as a continuous ribbon/continuous strip. Such continuous ribbon (or other form of the auxiliary sheet) may be provided from a sheet storage, such as a reel, and it may be conveyed after use to a waste sheet storage (such as a waste sheet reel).

In a group of special embodiments, the second object(s) is/are mounted relative to the auxiliary sheet and conveyed relative to the sonotrode by the step of displacing the auxiliary sheet.

Especially, but not only, in embodiments of this group of special embodiments, the auxiliary sheet may include a marking, such as an optical marking or possibly also a magnetic or other label, and the method includes using a sensor to position the auxiliary sheet. The sensor may be mounted in a defined position relative to a support (frame or the like) to which also the vibration generating device with the sonotrode is mounted.

By these optional features, the auxiliary sheet is provided with additional functions, namely with conveying and/or positioning.

The invention also concerns an apparatus configured for carrying out any embodiment of the method described herein.

The sonotrode by which the vibration is applied may be coupled to a device for generating the vibration. Such a device may for example be a hand-held electrically powered device including appropriate means, such as a piezoelectric transducer, to generate the vibrations. Alternatively, the device may belong to an apparatus configured for automatically carrying out the method, which apparatus includes a conveyor unit for conveying the auxiliary sheet (and the second object(s) and the first object(s)) relative to the sonotrode.

The mechanical vibration may be longitudinal vibration; the sonotrode by which the vibration is applied may vibrate essentially perpendicular to the surface portion (and the tool is also pressed into the longitudinal direction). I.e., the high frequency vibration amplitude will be longitudinal and perpendicular to the surface of the first object. This does not exclude lateral forces in the sonotrode, for example for moving the sonotrode over the surface portion.

The sonotrode in many embodiments is used to press the second object against the first object while the vibrations act. For applying a counter force to the first object, a non-vibrating support may be used (i.e. the sonotrode presses the second object and the first object against a non-vibrating support). Such non-vibrating support may for example be a working table or be constituted by a frame that holds the first object, etc.

The mechanical vibration may be ultrasonic vibration, for example vibration of a frequency between 15 KHz and 60 kHz, especially between 20 KHz and 40 kHz. For typical sizes of second objects (for example with characteristic lateral dimensions of about 1 cm) and dimensions of composite parts for example for the automotive industry (car body parts), a power of around 100-200 W has turned out to be sufficient, although the power to be applied may vary strongly depending on the application. More generally, the power will be around 50-400 $W/cm^2$ (relating to the area on which the sonotrode impinges), in particular between 100 and 200 $W/cm^2$.

In any embodiment, there exists the option of carrying out the method by a device that includes an automatic control of the pressing force. For example, the device may be configured to switch the vibrations on only if a certain minimal pressing force is applied, and/or to switch the vibrations off as soon as a certain maximum pressing force is achieved. Especially the latter may be beneficial for parts of which an undesired deformation must be avoided, such as certain car body parts.

BRIEF DESCRIPTION OF THE DRAWINGS

In the following, ways to carry out the invention and embodiments are described referring to drawings. The drawings are schematic in nature. In the drawings, same reference numerals refer to same or analogous elements. The drawings show.

DETAILED DESCRIPTION OF THE INVENTION

Figure 1:
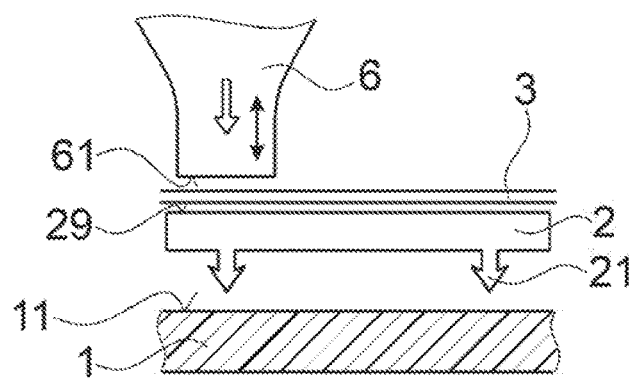
FIGS. 1 and 2, in section, a configuration during two different stages.

In accordance with the embodiment shown in FIG. 1, a second object 2 is fastened to a first object 1. The first object includes a first attachment surface 11 facing towards proximally, and, at least at the first attachment surface, a thermoplastic material solid at room temperature.

The second object 2 is metallic. It has a structure capable of making a positive-fit connection with material of the first object after the latter has flown. More in particular, the second object has protrusions 21 that form an undercut with respect to axial directions.

For the fastening step, the second object 2 is pressed against the first object 1 while energy is coupled into the second object 2 until a flow portion of the thermoplastic material of the first object flows relative to the second object to generate, after re-solidification, a positive-fit connection between the first and second objects. This fastening principle is described in more detail in WO 2016/071 335 or in Swiss patent application 01361/16 (first embodiment).

In accordance with the present invention, the energy coupled into the second object is mechanical vibration energy from a sonotrode 6 via an auxiliary sheet 3, namely a paper sheet in the embodiment of FIG. 1. The sonotrode is used to press the second object 2 against the attachment surface 11 while mechanical vibration energy is coupled from the sonotrode into the second object, through the auxiliary sheet 3 that is between the—distal—coupling-out surface 61 of the sonotrode 6 and a—proximal—coupling-in surface 29 of the second object.

Figure 2:
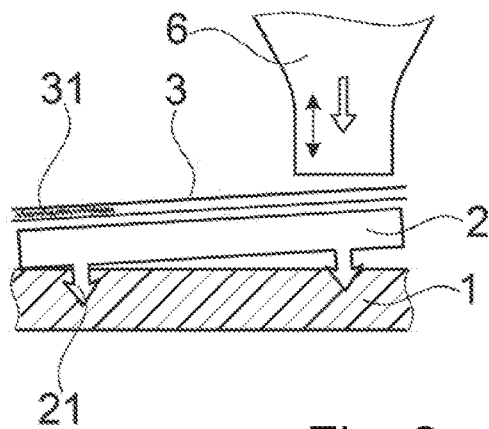

After this process (first fastening step) has been carried out at a first fastening location, the second object 2, the first object 1 and the auxiliary sheet all are displaced relative to the sonotrode 6 (for example, by being displaced relative to a support that defines the lateral (x-y-) position of the sonotrode or by the sonotrode being displaced with the objects and the sheet maintaining their position relative to a support (table or the like). FIG. 2 shows the arrangement at the onset of a second fastening step. The section of the auxiliary sheet 3 through which in the first fastening step the vibration was coupled into the second object (the first section 31) may be carbonized to some extent or otherwise irreversibly altered. By the relative displacement of the auxiliary sheet relative to the sonotrode, an other, fresh, second section is used for transmitting the mechanical vibration onto the second object in the second fastening step.

Figure 3:
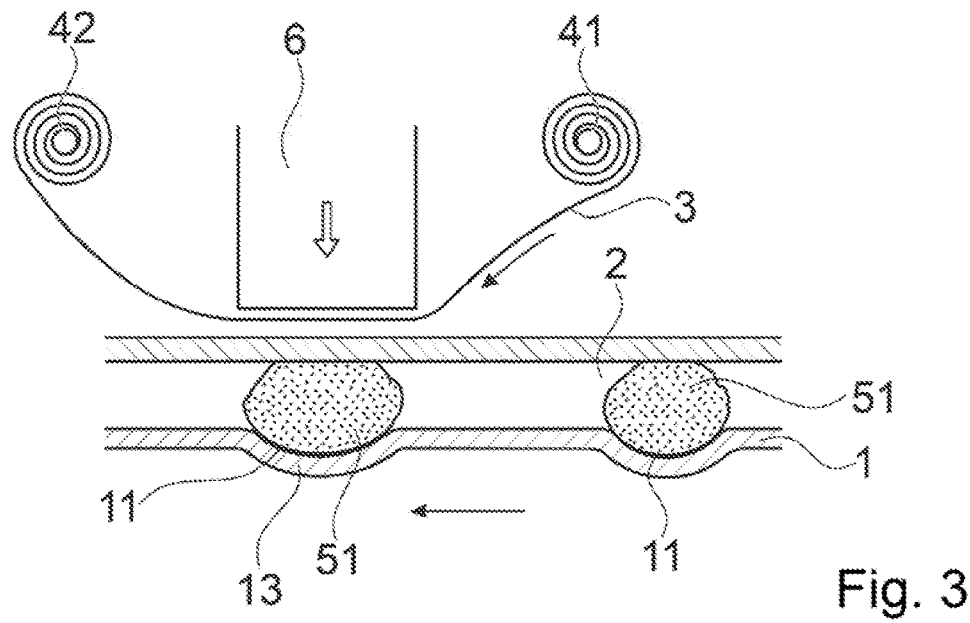
FIG. 3 a section through an alternative configuration.

FIG. 3 illustrates an arrangement that has the following features:
- The first and second objects 1, 2 are both of a sheet material, and a resin 51 is placed between the first and second objects. For confining the resin, if necessary, the first object and/or the second object may have optional indentations 13 or other confining structures. The fastening step includes causing the resin to cross-link by the effect of the mechanical vibration. The principle of and different approaches for mechanical vibration caused resin cross-linking are disclosed in PCT/EP2017/058641 or Swiss patent application 01 612/16.
- The auxiliary sheet, being a paper sheet, is dispensed from an auxiliary sheet storage being a first paper reel 41, and the used paper sheet material is collected in a waste auxiliary sheet storage being a second paper reel 42.
- The displacement of the auxiliary sheet 3 relative to the sonotrode 6 (in length units) between two fastening steps does not necessarily correspond to the displacement of the first and second objects relative to the sonotrode. Rather, the auxiliary sheet is, for example, displaced by little more than a width of the contact area with the sonotrode, whereas the displacement of the first and second objects corresponds to the distance between two neighboring fastening locations.

These features are independent of each other, i.e., it would be possible to realize them individually, or all combined, or in any sub-combination.

Figure 4:
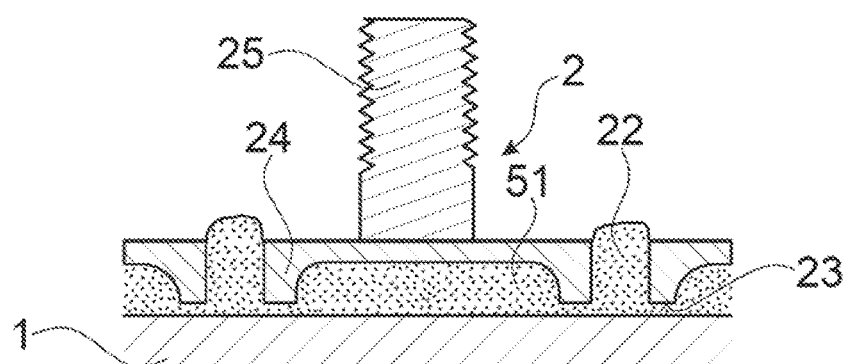
FIG. 4 a section through a fastener attached to a first object.

FIG. 4 shows an example of a second object 2 fastened, by the method according to the invention, to a first object 1 by means of a resin 51. The second object 2 is a fastener having an anchoring plate 24 (sometimes called "fastener head") and a fastening element 25 bonded thereto. The fastening element can have any property of a state-of-the art fastener such as a threaded bolt (as depicted) a bolt without a thread, a pin, a nut, a hook, an eyelet, a base for a bayonet coupling, etc. The anchoring plate has a plurality of through openings 22 and at least one distally protruding spacer element 23. Such spacer elements 35 may define a minimum distance between the surface of the first object and the distal surface of the anchoring plate, thereby ensuring that a resin 51 layer of a certain minimal thickness remains between the first and second objects after the process.

If the method is applied to discrete second objects as shown in FIG. 4, the different fastening steps may, for example, be carried out for different second objects instead of for different locations of the second object as shown in FIGS. 1 and 2.

Figure 5:
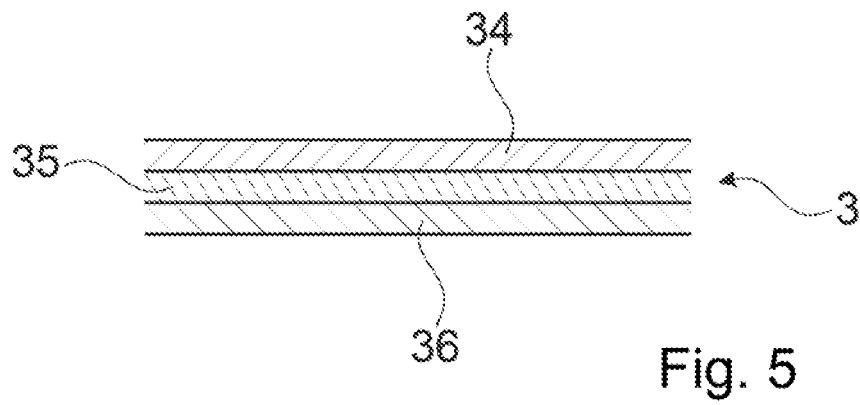
FIG. 5 a section through a special embodiment of an auxiliary sheet.

FIG. 5 shows cross section of an auxiliary sheet 3 with multiple layers 34, 35, 36. The layers may but do not need to have different properties in terms of material composition, texture, thickness and/or other properties. The adhesion between the layers may be comparably small compared to the dimensional stability of the material within the layers, whereby relative shifts in x-y-directions may be absorbed also, and for example predominantly, at the interfaces between the layers 34, 35, 36.

In a variant, an auxiliary sheet with at least two layers may include a polymer separating film between two adjacent layers. Thereby-in-plane friction between the layers is further reduced.

Figure 6:
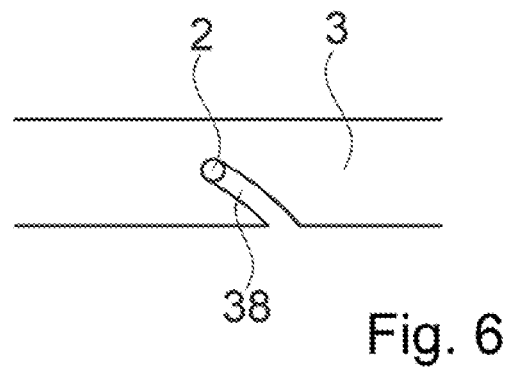
FIGS. 6 and 7 a view of an auxiliary sheet conveying a second object and a view of a configuration with an auxiliary sheet conveying second objects, respectively.

FIG. 6 illustrates the principle that the auxiliary sheet may be used to mount the second object 2.

For illustration purposes, the second object which is assumed to have a shaft-like portion, similar to the second object shown in FIG. 4 having the bolt-shaped fastening element 25. The auxiliary sheet 3 is strip-like with slits 38, and with a second object 2 mounted to each slit.

Figure 7:
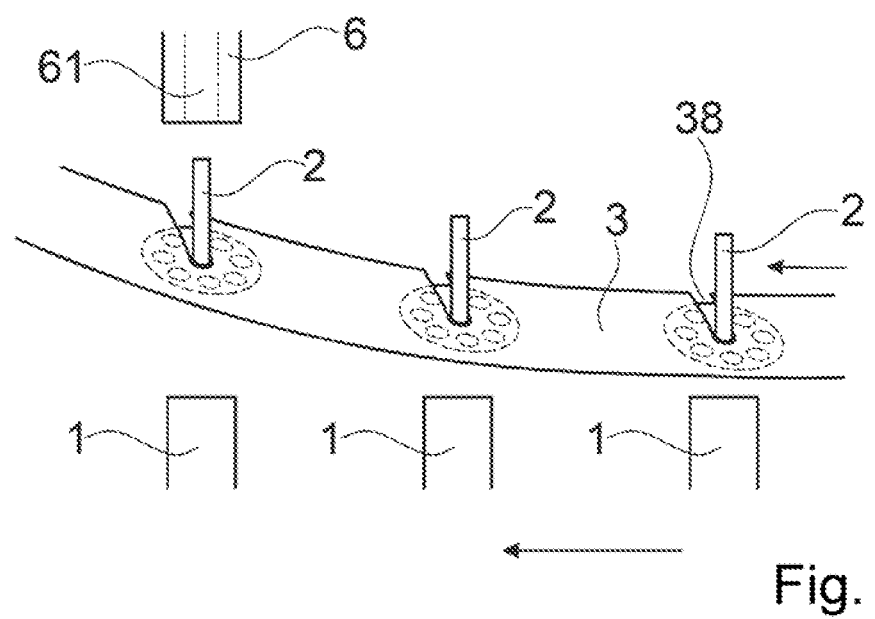

FIG. 7 very schematically illustrates the according working principle: the auxiliary sheet carrying the second objects as well as the first object or first objects 1 are moved relative to the sonotrode. FIG. 7 illustrates the situation with multiple first objects, one first object per second object, however, the teaching also applies to several fastening locations on a single first object or to mixed arrangements, for example with multiple first objects, each with a plurality of fastening locations.

As soon as a second object, the coupling surface of which is covered by the auxiliary sheet, as well as distally thereof the first object (and if necessary a resin or other agent, not shown in FIG. 7) are positioned relative to the sonotrode, the sonotrode causes the above-described fastening step for this particular second object and is subsequently retracted. In FIG. 7, the sonotrode is illustrated to have a cavity 61 for accommodating the fastening element or other shaft portion during the fastening step.

Then, the auxiliary sheet moves on, and so does the first object/do the first objects 1 until the next second object and the next first object/next fastening location are in the desired position relative to the sonotrode 6, whereupon the next fastening step takes place.

Figure 8:
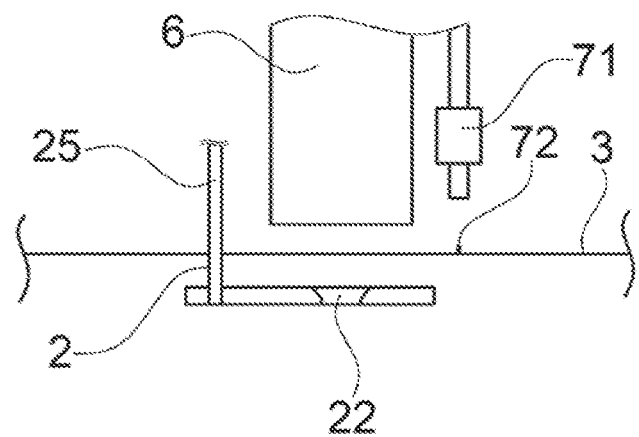
FIG. 8 the principle of using a marking on the auxiliary sheet for positioning the second object.

FIG. 8 illustrates an optional feature, namely a marking 72 on the auxiliary sheet that is used to position the auxiliary sheet relative to the sonotrode and thus for example also, given a defined position of the first object relative to a support to which the sonotrode is mounted, also relative to the first object. In the depicted configuration, the marking 72 is an optical marking, for example a positioning cross or the like. A camera 71 or other sensor having a fixed in-plane position relative to the sonotrode 6 is used to position the auxiliary sheet. By the second object 2—here illustrated to have an anchoring plate and a fastening element 25—having a precisely defined position relative to the auxiliary sheet, the marking 72 is a means for positioning the second object 2 relative to the sonotrode 3 and hence possibly also relative to the first object.

If necessary, a plurality of markings may be used.

Figure 9:
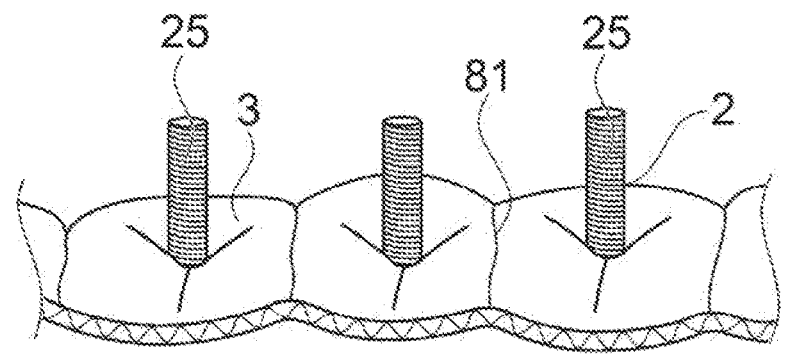
FIG. 9 a variant of the concept of FIG. 6.

FIG. 9 shows a variant of a concept illustrated also illustrated in FIGS. 6 and 7. Namely, the auxiliary sheet 3 forms a strip holding a plurality of the second objects 2. To this end, the strip-like auxiliary sheet 3 has a plurality of openings through which the second objects extend, with the anchoring plate (not visible in FIG. 9) on the distal side facing the first object and with a fastening element 25 extending through the respective opening to the proximal side. The auxiliary sheet may, for example, be formed as endless strip with perforations forming pre-determined separating locations 81.

In FIG. 9, the auxiliary sheet is depicted to be of corrugated cardboard.

Figure 10:
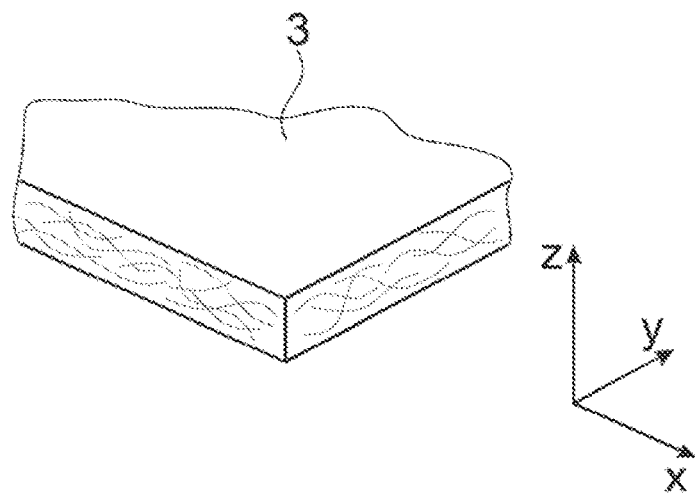
FIGS. 10 and 11 a sheet of a paper-like material with in-plane running fibers.

FIG. 10 illustrates a sheet of paper-like material next to a coordinate system. The fibers of the paper-like material are longer than a thickness (z-extension) of the auxiliary sheet 3. In an embodiment, the paper-like material has a low density of at most 500 kg/m$^3$ and is compressible in z-direction.

Figure 11:
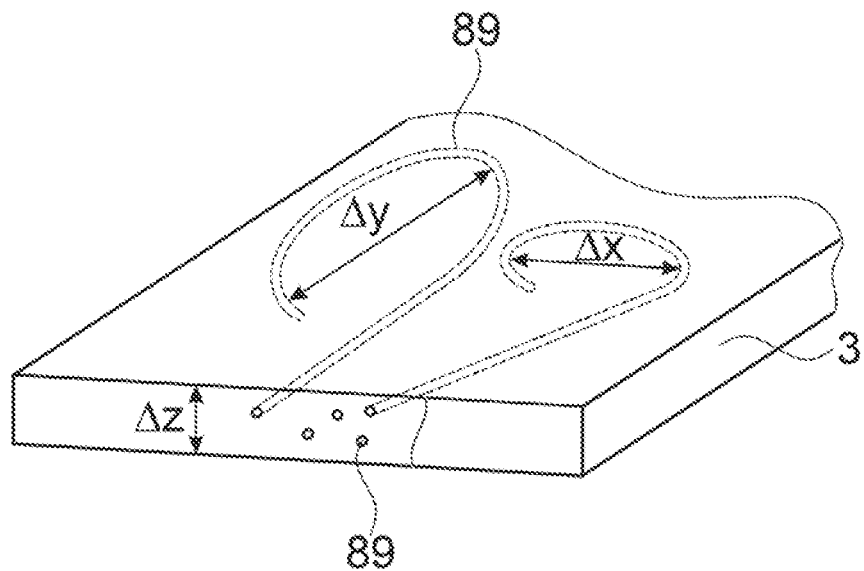

Upon compression, as illustrated in FIG. 11, the fibers 89 in the paper-like material may extend essentially in-plane and be densely packed so that a further compression in z-direction encounters large resistance, as schematically illustrated in FIG. 11 by the characteristic space Δz a fiber takes in z-direction, whereas their characteristic extensions in x and y direction Δx and Δy are unaffected and are much larger so that in these directions there is much more flexibility.

Especially, the compression in z-direction may be such that the elastic modulus in z-direction is larger than the elastic modulus E (Young's modulus) in in-plane (x-y-) directions by at least a factor 5, preferably by at least a factor 10, for example even by a factor 20 or a factor 50 or a factor 100.

Figure 12:
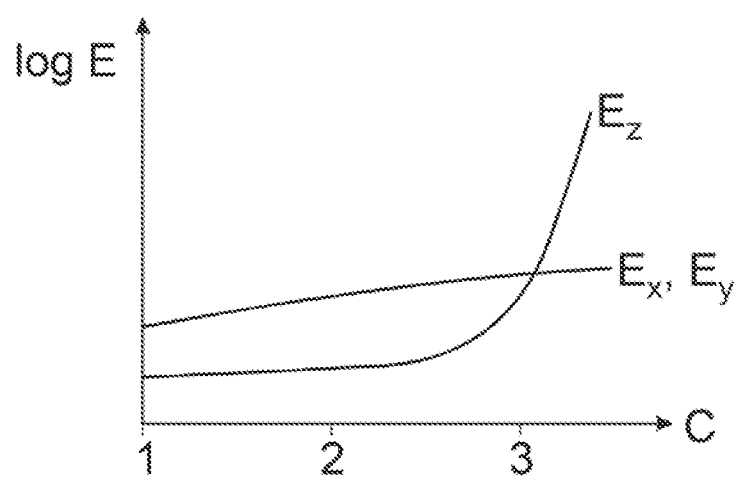
FIG. 12 a diagram illustrating the out-of-plane- and in-plane-stiffnesses as a function of axial compression.

FIG. 12 illustrates a diagram showing the principle. An initial modulus in an uncompressed state may be lower in z-direction ($E_z$, denoting the modulus in z-direction) than in x and y directions ($E_x$, $E_y$) due to the limited number of contact points between fibers. Upon compression (the abscissa shows the compression factor of compression in z-direction), at a certain point the stiffness in z-direction increases drastically due to the neighboring fibers forming a densely packed structure, wherein the fibers themselves, depending on their material and structures, are not compressible or compressible only to a very limited extent. The in-plane modulus ($E_x$, $E_y$) is essentially unaffected by the compression, i.e., it goes up only slightly to the enhanced friction between neighboring fibers.

Figure 13:
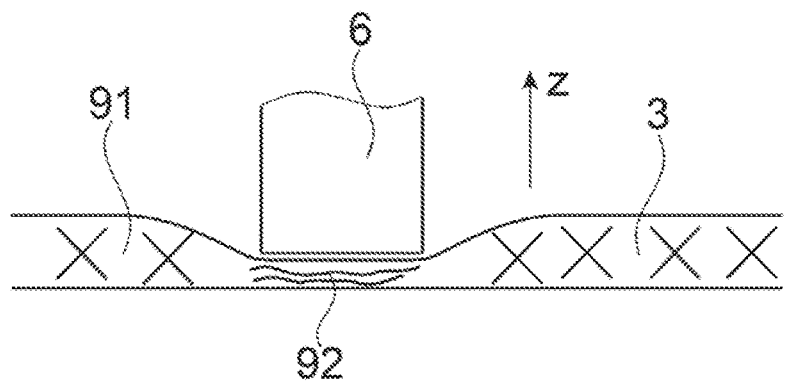
FIG. 13 the act of compressing an axially well compressible paper-like auxiliary sheet.

FIG. 13 illustrates the principle of compressing an axially well compressible paper-like auxiliary sheet. Prior to the application of the mechanical vibration, these materials may be compressible to yield, in addition to an uncompressed region 91, a compressed region 92 between the sonotrode 6 and the second object. The compression in this is substantial, i.e., the local thickness of the auxiliary sheet 3 is locally reduced by for example at least a factor 1.5, especially at least a factor 2 or more. As illustrated in FIG. 12, to the compression, the effective stiffness (Young's modulus E) in z-direction becomes, in the compressed region 92, higher than the effective stiffness in in-plane directions by for example at least a factor 5, preferably by at least a factor 10, for example even by a factor 20 or a factor 50 or a factor 100.

Axially well compressible paper-like materials include materials with air-filled volumes, such as light cardboard materials as well as blotting paper and the like.

Figure 14:
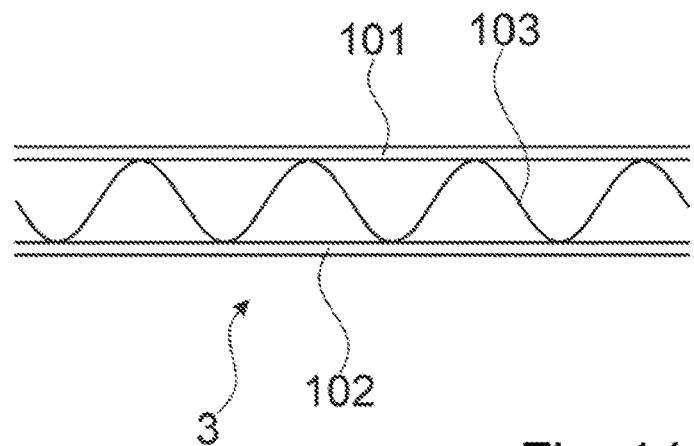
FIG. 14 an auxiliary sheet of corrugated cardboard.

FIG. 14 shows a specific example of a sandwich structure yielding an axially well compressible material, namely corrugated cardboard. Corrugated cardboard has the property of including a first outer layer 101, a second outer layer 102, and an intermediate layer 103 with a low average density and low dimensional stability. Other paper-based materials with two outer layers and a low stability intermediate layer with a structure different from corrugated cardboard are possible also. There exist variants of corrugated cardboard (or similar) with more layers, for example two thin outer layers, a thin middle layer, and two intermediate layers.

Due to the low stability of the intermediate layer, the material is axially well compressible. Also, the outer layers 101, 102 are only weakly coupled in in-plane directions, hence any in-plane oscillation will be damped effectively.

Figure 15:
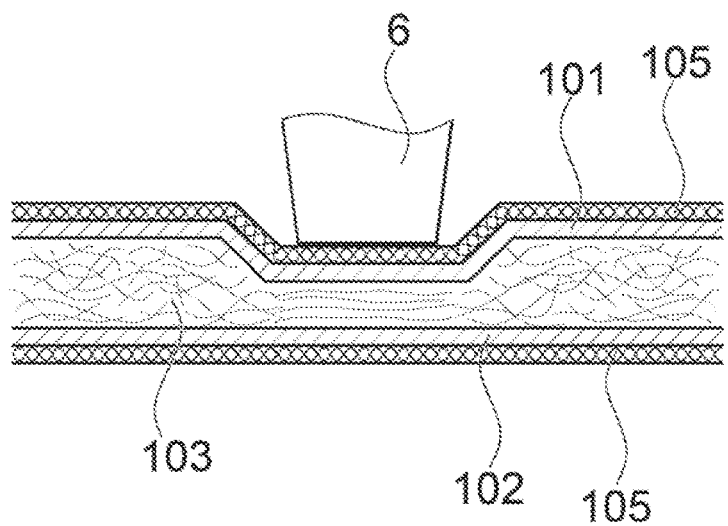
FIG. 15 an auxiliary sheet with thermoplastic coatings.

FIG. 15 illustrates, using the example of a material with an axially compressible middle layer, a further option. Namely, the auxiliary sheet includes outer polymer film coatings 105. Thereby, in-plane friction between the auxiliary sheet and the sonotrode and/or the second object, respectively, is further reduced. Also, such coating may serve as protection layer reducing abrasion of the surface of the sonotrode and/or the second object.

It is generally possible to coat one surface or both surfaces of the auxiliary sheet (of any composition) and or to provide at least one inner polymer film as mentioned hereinbefore referring to FIG. 5.

Especially, the material of the coating may be thermoplastic with a comparably low liquefaction temperature. Suitable coating materials include PE, PP, or a not liquefiable or hard to liquefy polymer with a very low coefficient of friction like PTFE or alikes.

What is claimed is:

1. A method of fastening a second object to a first object, comprising the steps of:
    providing the first object comprising a first attachment surface;
    providing the second object being of a metallic or ceramic material or of a fiber composite material;
    placing the second object relative to the first object;
    placing a sonotrode relative to the second object;
    placing an auxiliary sheet between the sonotrode and the second object; and
    while the sonotrode is in contact with the auxiliary sheet and the auxiliary sheet is in contact with the metallic or ceramic material or the fiber composite material, causing mechanical vibration to act from the sonotrode on the second object via the auxiliary sheet to locally bond the second object to the first object;
    wherein the auxiliary sheet is made of an auxiliary sheet material containing at least one of paper and of cardboard.

2. The method according to claim 1, wherein in the step of causing the mechanical vibration to act from the sonotrode on the second object via the auxiliary sheet, the mechanical vibration acts via a first section of the auxiliary sheet, the method further comprising:
    displacing the auxiliary sheet relative to the sonotrode, and causing mechanical vibration to act from the sonotrode on a different location of the second object or to a different second object via a second section of the auxiliary sheet different from a first section.

3. The method according to claim 2, wherein the auxiliary sheet is continuous, the first and second sections of the auxiliary sheet being contiguous.

4. The method according to claim 2, further comprising a step of providing an auxiliary sheet storage, wherein displacing the auxiliary sheet relative to the sonotrode comprises removing an amount of auxiliary sheet material from the auxiliary sheet storage.

5. The method according to claim 4, wherein the auxiliary sheet storage comprises an auxiliary sheet reel, and wherein removing the amount of auxiliary sheet material from the auxiliary sheet storage comprises unrolling the auxiliary sheet storage to a pre-determined extent.

6. The method according to claim 2, further comprising a step of providing a waste auxiliary sheet storage, wherein displacing the auxiliary sheet relative to the sonotrode comprises placing an amount of auxiliary sheet material in the waste auxiliary sheet storage.

7. The method according to claim 6, wherein the waste auxiliary sheet storage comprises a waste auxiliary sheet reel.

8. The method according to claim 1, wherein the auxiliary sheet is a sheet of a pulp based material.

9. The method according to claim 8, wherein the auxiliary sheet is a paper sheet.

10. The method according to claim 1, wherein the auxiliary sheet is a sheet having multiple sheet layers.

11. The method according to claim 10, wherein at the sheet layers or at least two of the sheet layers have a low adhesion between them.

12. The method according to claim 10, comprising a polymer film between the sheet layers or at least two of the sheet layers.

13. The method according to claim 1, wherein the auxiliary sheet material is a low density paper material, the density being at most 670 kg/m$^3$.

14. The method according to claim 13, wherein the auxiliary sheet material is essentially free of any binder or filler.

15. The method according to claim 1, wherein the auxiliary sheet material is compressible.

16. The method according to claim 1, wherein the auxiliary sheet material is a sandwich material with at least a first and second outer layer and at least one intermediate layer of an average density lower than an average density of the first and second outer layers, the intermediate layer being between the first and second outer layers.

17. The method according to claim 16, wherein the auxiliary sheet material is corrugated cardboard.

18. The method according to claim 1, wherein the auxiliary sheet has at least one polymer coating.

19. The method according to claim 1, wherein the auxiliary sheet has a thickness of at least 0.2 mm.

20. The method according to claim 1, and comprising the step of compressing the auxiliary sheet by a pressing force on the sonotrode.

21. The method according to claim 20, wherein compressing the auxiliary sheet comprises starting to compress the auxiliary sheet before the mechanical vibration sets in.

22. The method according to claim 20, wherein compressing comprises compressing the auxiliary element at a location of the sonotrode so that its thickness is reduced by at least a factor 1.5.

23. The method according to claim 1, wherein the auxiliary sheet has a grammage of at least 50 g/m$^2$.

24. The method according to claim 11, wherein the auxiliary sheet has a grammage of at least 100 g/m$^2$.

25. The method according to claim 1, wherein the first object comprises liquefiable thermoplastic material in a solid state,
wherein the second object comprises a surface portion that has a coupling structure with an undercut and/or is capable of being deformed to comprise such a coupling structure with an undercut, whereby the second object is capable of making a positive-fit connection with the first object, and
wherein causing the first object to locally bond to the second object comprises pressing the coupling structure of the second object while the mechanical vibration acts until a flow portion of the thermoplastic material of the first object is liquefied and flows into the coupling structure of the second object, whereby after re-solidification a positive-fit connection between the coupling structure and the flow portion secures the second object to the first object.

26. The method according to claim 1, wherein the step of placing the second object relative to the first object comprises placing the second object relative to the first object with a resin between the first attachment surface and a second attachment surface of the second object, and
wherein causing the first object to locally bond to the second object comprises activating the resin to cross-link by the mechanical vibration, whereby the resin, after cross-linking, secures the second object to the first object.

27. The method according to claim 26, wherein the second attachment surface in the step of placing the second object relative to the first object is placed to abut against the first attachment surface, with the resin between the first and second attachment surfaces.

28. The method according to claim 26, wherein the second attachment surface comprises at least one indentation or protrusion.

29. The method according to claim 1, wherein the vibration is a longitudinal vibration.

30. The method according to claim 1, wherein the second object is a connector equipped for fastening a further object to the first object.

31. The method according to claim 1, wherein placing the second object relative to the first object comprises mounting the second object on the auxiliary sheet and using the auxiliary sheet to place the second object relative to the first object.

32. The method according to claim 1, wherein the auxiliary sheet comprises a marking, and
wherein placing the auxiliary sheet comprises positioning the auxiliary sheet so that the marking is in a defined position relative to a marking sensor.

33. An apparatus, comprising a sonotrode and a vibration generating device capable of setting the sonotrode into mechanical vibration, the apparatus being configured to carry out the method according to claim 1.

* * * * *